Jan. 1, 1929.

J. J. KUTSCHEID

BLOW TORCH MOUNTING

Filed Dec. 31, 1926

Inventor
John J. Kutscheid
By Daniel Brennan
Attorney

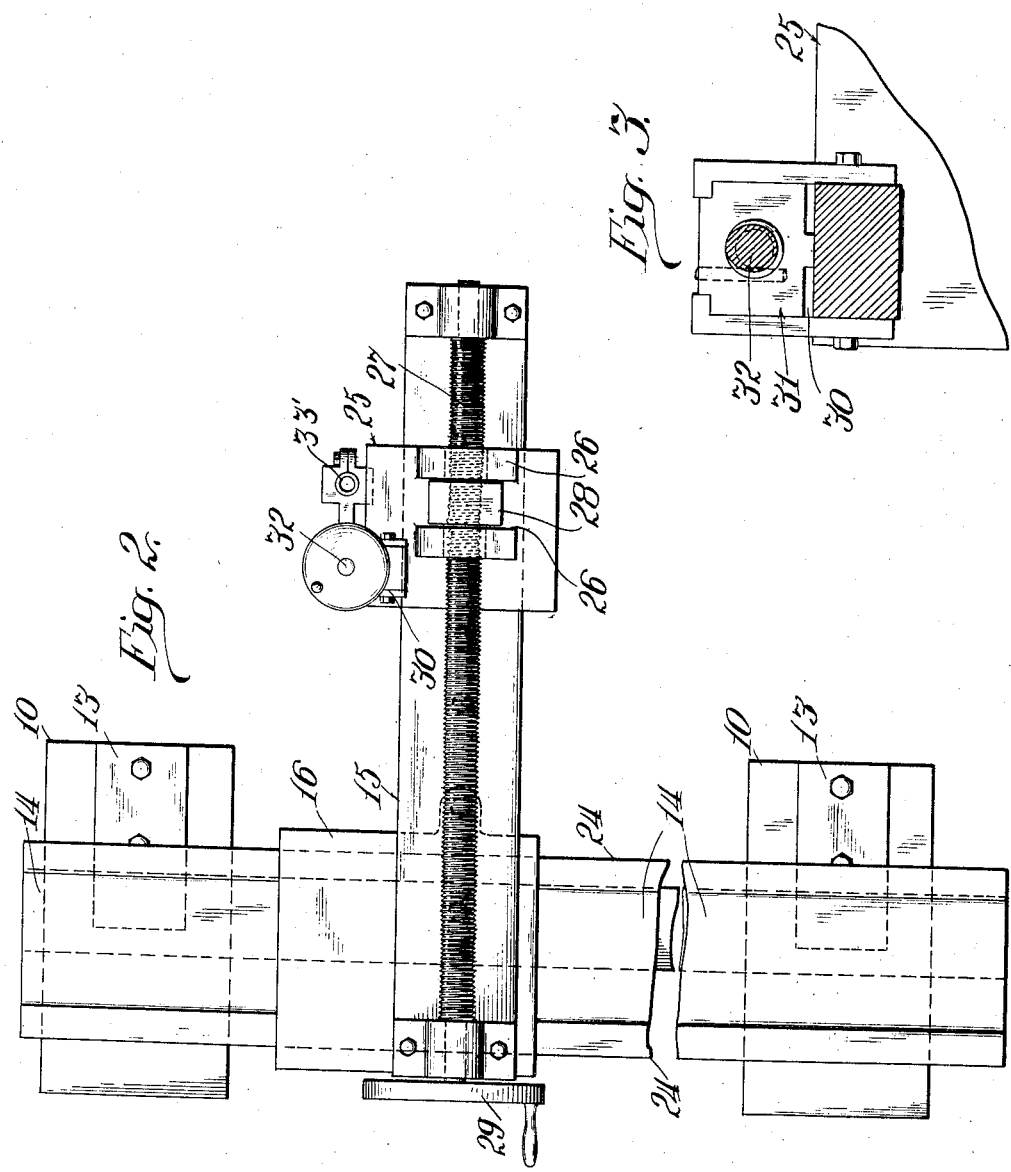

Jan. 1, 1929.
J. J. KUTSCHEID
1,696,916
BLOW TORCH MOUNTING
Filed Dec. 31, 1926   3 Sheets-Sheet 3
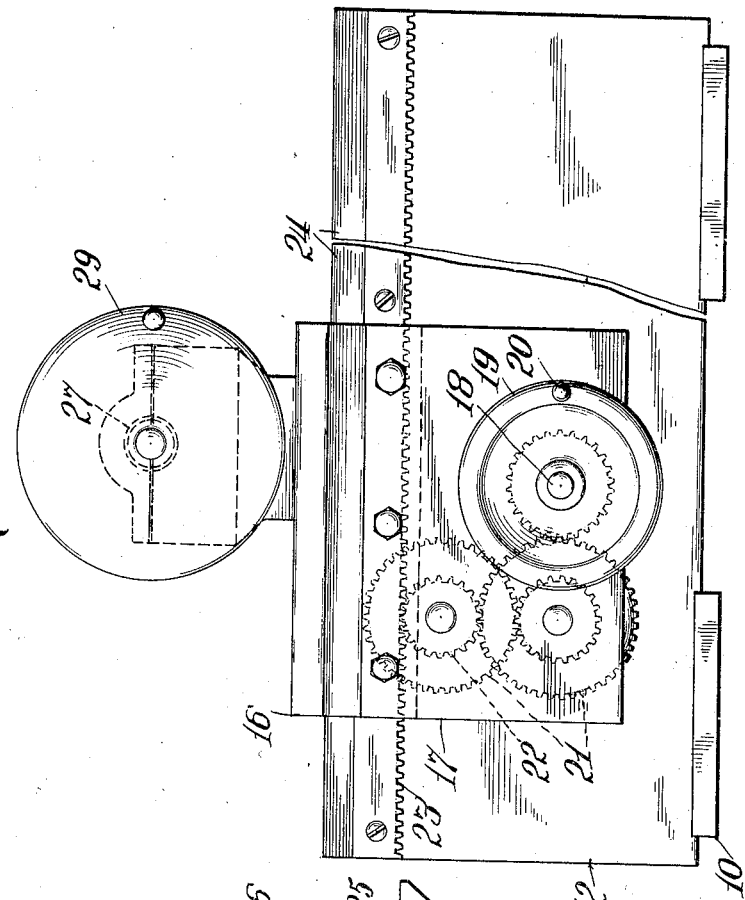
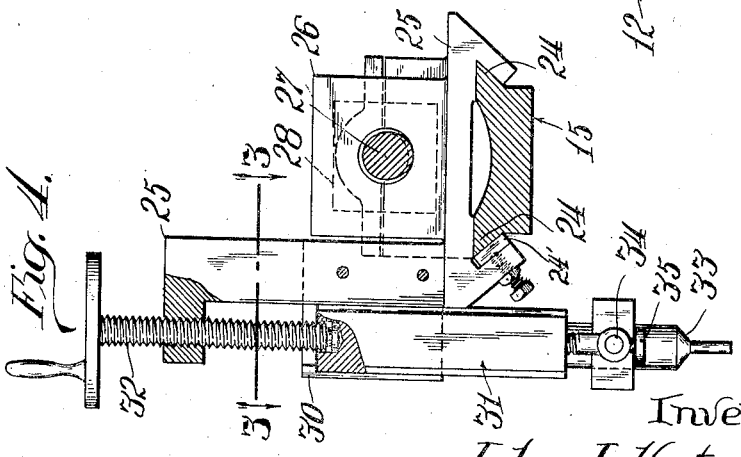
Inventor
John J. Kutscheid
By Daniel Brennan
Attorney Patented Jan. 1, 1929.

1,696,916

UNITED STATES PATENT OFFICE.

JOHN J. KUTSCHEID, OF CHICAGO, ILLINOIS.

BLOW-TORCH MOUNTING.

Application filed December 31, 1926. Serial No. 158,355.

The invention relates to improvements in blow torch mountings and has for its object the provision of an improved mounting of this character for adjustably mounting acetylene torches, or the like, for use in cutting steel, or other metal objects.

Another object of the invention is the provision of such a mounting so constituted and arranged that the cutting work done by the cutting torch is always closely adjacent to and under the close supervision of the operator.

A further object of the invention is the provision of an apparatus of the character described in which the blow torch carriage is carried upon a solid bed or guideway, rigid enough to prevent vibration of the blow torch and rigidly supported throughout its full length by a solid supporting means having a comparatively wide bearing surface on the floor or other object on which the apparatus is to rest while in operation. By mounting the blow torch in a manner to be entirely free from vibration, the sensitiveness of the jet which attacks the metal may be more accurately controlled.

A still further object of the invention is the provision of an apparatus of the character described in which there is a rigidly supported guideway having mounted thereon intermediate its ends a carriage upon which is provided a second guideway positioned at right angles to said first guideway, a blow torch carrier mounted on said second guideway for sliding movement thereon, driving gear for said carriage, driving gear for said torch carrier, and means for operating each driving gear provided on said carriage and closely adjacent each other, whereby a single operator may conveniently and rapidly adjust said torch carrier to any desired position.

A still further object of the invention is the provision of an apparatus of the character described which may be cheaply and easily manufactured and installed, conveniently operated, and furthermore, possess the necessary qualities of durability and simplicity.
Other objects will appear hereinafter.

The invention consists in the combination and arrangement of parts hereinafter described and claimed.

The invention will be best understood by reference to the accompanying drawings forming a part hereof and in which, Fig. 1 is an end view, shown partially in section, of a blow torch mounting embodying the invention;

Fig. 2 is a partial top plan view of the same;

Fig. 3 is an enlarged detail horizontal section taken substantially on line 3—3 of Fig. 4;

Fig. 4 is a section taken substantially on line 4—4 of Fig. 1; and

Fig. 5 is a partial front view of the mounting.

Figure 1:
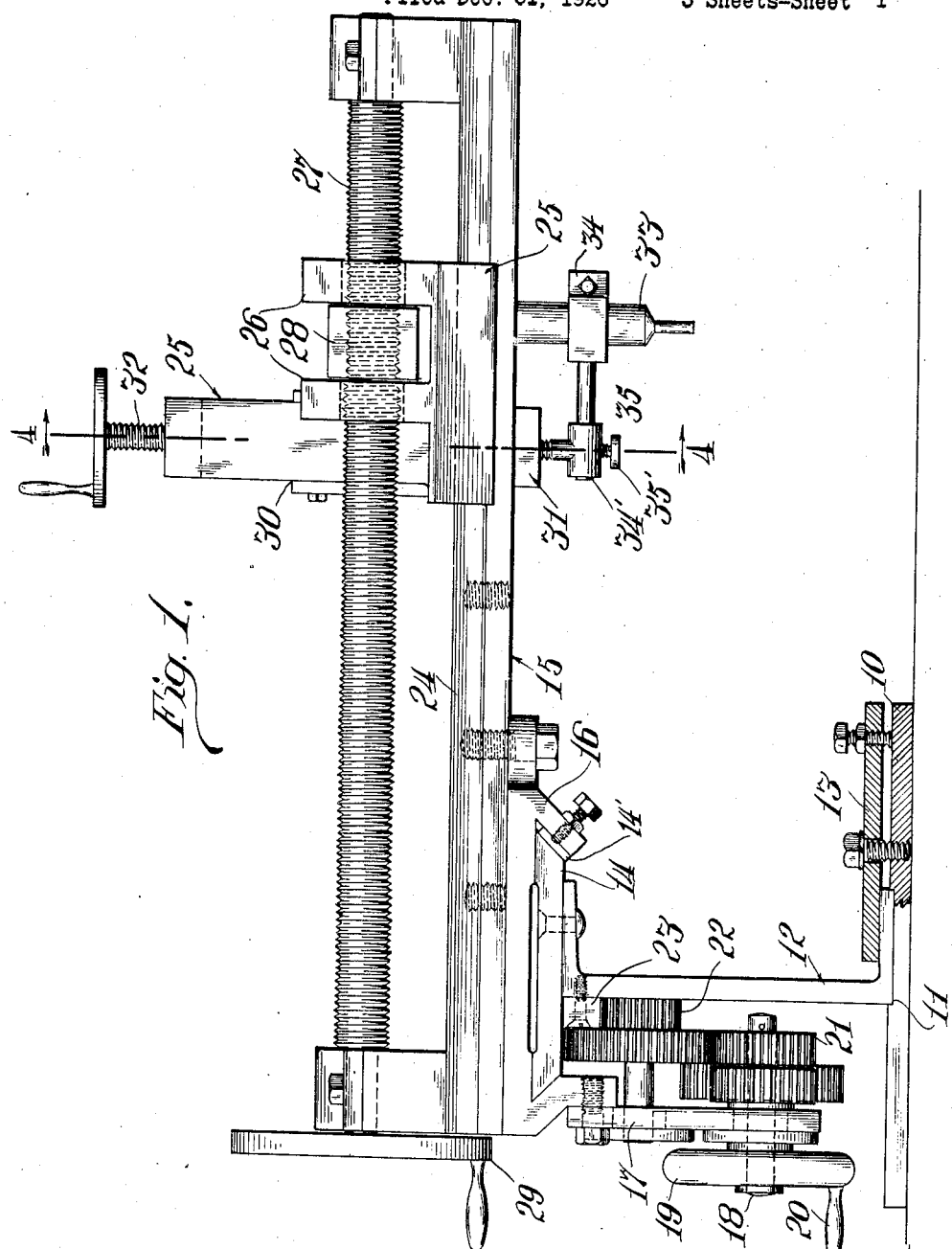

The preferred embodiment of the invention illustrated in the drawings comprises a plurality of base plates 10, adapted to rest flat upon a floor, or other supporting surface, and having a comparatively wide bearing surface thereon, and provided with central recesses 11, adapted to receive the lower flange of a channel beam 12, each base plate 10 being provided with a suitable clamping bar 13, to hold said channel beam in position thereon, as shown in Fig. 1, said clamping plates or bars 13 being pivotally secured to said plates 10 by means of screws or bolts, or in any other suitable manner intermediate their ends, and are provided with clamp screws at one end for rigidly and securely clamping the said lower flange of the channel beam 12 in the recess 11. A horizontal guide bar 14, is secured by means of rivets or in any other suitable manner to the upper flange of the beam 12, and a transversely extending carriage 15 is provided with a guide shoe 16 sliding upon the guide bar 14. An adjustable gib 14' is provided as shown at one side of guide bar 14 to effect a nice fit and compensate for wear. The carriage 15 is also provided at its front end with a depending apron or plate 17, carrying an operating shaft 18, operable by a hand wheel 19, carrying a crank 20. The shaft 18 is connected by a reducing train of gears 21 with a pinion 22, meshing with a rack bar 23, arranged on the beam 12 immediately below the guide bar 14.

The arrangement is such that by manipulating the hand wheel 19, the carriage 15 may be adjusted as desired along the guide bar 14.

The guide bar 14 is designed and intended to have considerable length, so that objects of considerable size may be operated on and, it will be noted, by this arrangement that the operator will always remain in close proximity to the carriage 15, walking along the guideway 14, as said carriage is adjusted thereon.

The transverse carriage 15, is provided with a transverse guideway 24, and a supporting head 25 is slidably mounted on the guideway 24. The supporting head 25 is provided with two upstanding guide-arms 26 loosely fitting over a transverse feed screw 27, the ends of which screws are journaled in bearings provided therefor at the ends of the guideway 24, said screw being arranged immediately above and spaced from the guideway 24, and parallel thereto as shown. A nut 28 is threaded on the feed screw 27, and is imprisoned between the guide plates 26, so that by turning the feed screw 27 the supporting head 25 will be adjusted to and fro along the guideway 24. The feed screw 27, is provided with a hand wheel 29, to facilitate manipulation thereof. The hand wheel 29 being provided at the end of the feed screw 27 adjacent the said hand wheel 19, whereby a single operator may conveniently operate both of said operating wheels. An adjustable gib 24' is provided at one side of guideway 24 to effect a nice fit and compensate for wear.

The supporting head 25, is provided with a vertical guideway 30, and a torch block 31, is mounted to slide vertically in the guide way 30. A feed screw 32, is operatively connected, as shown, with the torch block 31, and whereby said torch block may be readily adjusted vertically. The torch block 31 carries an ordinary acetylene torch 33, equipped with a fuel supply pipe 33', said torch 33 being arranged as shown to project downwardly from the carriage 15, and thus operate upon work arranged on the floor immediately below said carriage. The torch 33, is supplied with fuel through a flexible hose (not shown) detachably connected with the tube 33', as will be readily understood by those skilled in this art.

The torch 33 is adjustably mounted in a clamp 34 provided with a stem 34' which is in turn rendered adjustable in a bracket 35 by a set screw 35', said bracket 35 being threaded in torch block 31, and whereby said torch may be readily adjusted into various angular positions. By this arrangement a simple and effective blow torch mounting is provided, by means of which the blow torch may be readly adjusted over a wide area and applied to comparatively large objects positioned on the floor under the path of travel of said torch.

It will be noted that the operator will always assume a position immediately in front of the carriage 15 and will thus always be in close proximity to the work being done by the torch, and whereby careful supervision of the work is facilitated. This provision is especially useful where a cut is to be made first parallel to the guide way 14, and then at right angles toward the operator who is thus enabled to carefully guide and control such cuts and thus produce accurate work.

The specific form and arrangement of parts disclosed is a simple and effective one for the purpose.

While a preferred embodiment of the invention has been illustrated and described, this is capable of variation and modification without departing from the spirit of the invention. It is, therefore, not desired to limit the patent to the precise details disclosed, but to include therein also such variations and modifications as fall within the scope of the appended claims.

Having fully described my invention what I claim as new and desire to secure by Letters Patent is:—

1. In combination, a guideway; a solid support for said guideway, extending the full length thereof, and having a relatively large bearing surface; a carriage mounted to travel on said guide-way; a rack bar along said guide-way; a train of gears on said carriage, one of said gears meshing with said rack bar; means on said carriage for operating said gears; a transverse guideway on said carriage; a feed screw extending along said transverse guideway; a supporting head slidable on said transverse guideway and operatively connected with said feed screw; and a torch mounted on said supporting head.

2. In combination, a guideway; a carriage mounted to travel on said guideway; a rack bar along said guideway; a train of gears on said carriage, one of said gears meshing with said rack bar; means on said carriage for operating said gears; a transverse guideway on said carriage; a feed screw extending along said transverse guideway; a supporting head slidable on said transverse guideway and operatively connected with said feed screw; means for operating said feed screw; said last mentioned means being in close proximity to said gear operating means and a vertically adjustable torch mounted on said supporting head.

3. In combination, a horizontal guideway; a carriage mounted to travel on said guideway; a rack bar along said guideway; a train of gears on said carriage, one of said gears meshing with said rack bar; means on said carriage for operating said gears; a transverse guideway on said carriage; a feed screw extending along said transverse guideway; a supporting head slidable on said transverse guideway and operatively connected with said feed screw; means for operating said feed screw arranged at one end of said transverse guideway and in close proximity to the said gear operating means; a vertical guideway on said head; a torch block mounted to travel on said vertical guideway; a feed screw arranged to feed said torch block along said vertical guideway; and a torch on said torch block.

4. In combination, a horizontally extending channel beam; a plurality of base plates clamped to the lower side of said channel beam and extending laterally therefrom; a horizontal guideway secured to the upper side of said channel beam; a transversely extending carriage slidable on said guideway; a rack bar extending along said guideway; a train of gears mounted on said carriage, one of said gears meshing with said rack bar; a hand wheel on said carriage for operating said gears; a transversely extending guideway on said carriage; a supporting head mounted on said transverse guideway; a feed screw for adjusting said supporting head along said transverse guideway; and a torch mounted on said supporting head.

5. In combination; a horizontally extending channel beam; a plurality of base plates clamped to the lower side of said channel beam and extending laterally therefrom; a horizontal guideway secured to the upper side of said channel beam; a transversely extending carriage slidable on said guideway; a rack bar extending along said guideway; a train of gears mounted on said carriage, one of said gears meshing with said rack bar; a hand wheel on said carriage for operating said gears; a transversely extending guideway on said carriage; a supporting head mounted on said transverse guideway; a feed screw for adjusting said supporting head along said transverse guideway; a vertical guideway on said supporting head; a torch block mounted on said vertical guideway; a feed screw arranged to adjust said torch block vertically along said vertical guideway; and a downwardly projecting torch mounted on said torch block.

In testimony whereof I affix my signature at 10 South La Salle Street, Chicago, Illinois.

JOHN J. KUTSCHEID.